United States Patent
Gawel et al.

(10) Patent No.: US 9,759,393 B2
(45) Date of Patent: Sep. 12, 2017

(54) ILLUMINATED FRAME SYSTEM

(71) Applicant: NOVOMATIC AG, Gumpoldskirchen (AT)

(72) Inventors: Marek Gawel, Gumpoldskirchen (AT);
Martin Wöls, Gumpoldskirchen (AT);
Ates Mesut, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 220 days.

(21) Appl. No.: 14/726,345

(22) Filed: May 29, 2015

(65) Prior Publication Data
US 2015/0260355 A1    Sep. 17, 2015

Related U.S. Application Data

(63) Continuation of application No. PCT/EP2013/003597, filed on Nov. 28, 2013.

(30) Foreign Application Priority Data

Nov. 29, 2012  (DE) .................... 20 2012 011 537 U

(51) Int. Cl.
| | |
|---|---|
| *F21V 1/00* | (2006.01) |
| *F21K 99/00* | (2016.01) |
| *G09F 13/04* | (2006.01) |
| *G09F 13/18* | (2006.01) |
| *A63F 13/25* | (2014.01) |

(Continued)

(52) U.S. Cl.
CPC .............. *F21K 9/50* (2013.01); *A63F 13/25* (2014.09); *F21K 9/60* (2016.08); *F21V 17/06* (2013.01); *F21V 33/008* (2013.01); *G09F 13/0413* (2013.01); *G09F 13/18* (2013.01); *F21Y 2115/10* (2016.08); *G09F 2013/049* (2013.01); *G09F 2013/0445* (2013.01); *G09F 2013/0481* (2013.01); *G09F 2013/222* (2013.01)

(58) Field of Classification Search
USPC .................... 362/235, 432, 234, 602, 382
See application file for complete search history.

(56) References Cited

U.S. PATENT DOCUMENTS

| | | | |
|---|---|---|---|
| 7,607,812 B2 * | 10/2009 | Kim ................ | F21S 8/033 362/602 |
| 2009/0154156 A1 * | 6/2009 | Lo ................... | F21V 5/00 362/234 |

(Continued)

FOREIGN PATENT DOCUMENTS

| | | |
|---|---|---|
| DE | 8509511 | 6/1985 |
| DE | 29513860 | 11/1995 |

(Continued)

OTHER PUBLICATIONS

German Patent Application No. 202012011537.5 filed Nov. 29, 2012 in the name of Novomatic AG, German Search Report dated May 24, 2013.

*Primary Examiner* — Daniel Hess
(74) *Attorney, Agent, or Firm* — Levine Bagade Han LLP

(57) ABSTRACT

The present invention relates to an illuminated frame system for framing a display unit, such as a screen and the like, comprising a frame on which lighting means, preferably in the form of LEDs, are arranged. An illuminated frame system of this kind may advantageously be used in gaming devices which have at least one screen.

21 Claims, 8 Drawing Sheets

(51) Int. Cl.
  *F21V 17/06* (2006.01)
  *F21V 33/00* (2006.01)
  *F21K 9/60* (2016.01)
  G09F 13/22 (2006.01)
  F21Y 115/10 (2016.01)

(56) References Cited

U.S. PATENT DOCUMENTS

| | | | |
|---|---|---|---|
| 2009/0244915 A1* | 10/2009 | Cooper | F21V 21/005 362/432 |
| 2010/0102685 A1* | 4/2010 | Ward | A47B 81/00 312/7.2 |
| 2011/0201411 A1 | 8/2011 | Lesley et al. | |
| 2012/0080903 A1* | 4/2012 | Li | B29C 45/1418 296/97.5 |
| 2013/0258682 A1* | 10/2013 | Pino | H01R 13/5219 362/382 |

FOREIGN PATENT DOCUMENTS

| | | |
|---|---|---|
| DE | 202008001253 | 5/2008 |
| DE | 202009010906 | 12/2009 |
| DE | 102009051544 | 10/2010 |
| EP | 1865477 | 12/2007 |
| GB | 2309812 | 6/1997 |
| JP | 2004-024804 | 1/2004 |
| WO | WO 84/04366 | 11/1984 |
| WO | WO 03/067014 | 8/2003 |
| WO | WO 2008/081383 | 7/2008 |
| WO | WO 2011/041883 | 4/2011 |
| WO | WO 2011/057762 | 5/2011 |

\* cited by examiner

ILLUMINATED FRAME SYSTEM

CROSS-REFERENCE TO RELATED APPLICATIONS

The present application is a continuation of PCT Application No. PCT/PE2013/003597, filed Nov. 28, 2013, which claims the benefit of German Patent Application No. 20201201537.5, filed on Nov. 29, 2012, both of which are incorporated by reference herein in their entireties.

BACKGROUND

The present invention relates to an illuminated frame system for framing a display unit, such as a screen and the like, comprising a frame on which lighting means, preferably in the form of LEDs, are arranged. An illuminated frame system of this kind may advantageously be used in gaming devices which have at least one screen.

It has become known to use illuminated frame systems around the screens of gaming devices in the form of for example, slot machines and/or entertainment machines or betting terminals, it being possible for said illuminated frame systems to highlight the outline of the gaming device but also to illuminate certain housing sections in order to make the illuminated housing sections or operator control elements which are arranged on them more visible, but also in order to highlight the entire gaming device and—for example in a gaming venue, with a large number of other gaming devices—to make it more attractive.

In this case, a first objective is to achieve a high illumination intensity in order to amplify the illumination and visibility. Secondly, it is necessary to ensure that a player or device operator standing in front of the gaming device is not dazzled or fatigued by being subjected to excessive light effects or even this impairing visibility of the information displayed on the screen of the gaming device.

EP 18 65 477 A1 discloses a slot machine having a plurality of screens, in which slot machine the two main screens are framed at the sides by frame strips on which a plurality of LEDs are fitted and reflector areas are provided in order to create various light effects without fatiguing the eyes of the player in the process.

U.S. Pat. No. 7,396,282 further discloses a gaming device of which the screens are arranged in a manner raised or elevated in relation to the device housing, so that a groove-like recess gap is formed between the framing of the screens, which framing projects in the manner of a collar, and the housing front which is situated beneath said framing, an LED strip being arranged in said recess gap in order to illuminate adjoining housing sections. The LED strip emits light beneath the collar-like, protruding framing edge of the screens, so that the screens are intended to give the impression of floating above the device housing.

LED strips are known, for example, from JP 09-258676.

US 2010/0027255 A1 discloses a light box as is used for backlighting x-ray images for example, wherein a panel which may be illuminated is framed by a frame of modular design in which a slot-like recess which is open toward the inside is provided for accommodating LEDs. The light which is output by the LEDs is fed from the slot which is open toward the inside into the narrow sides of the panel which may be illuminated, in order to illuminate said panel.

Illuminated frames of this kind for framing screens have to date been subject to various disadvantages. For example, screens of different formats have sometimes been used in gaming devices, this to date leading to different illuminated frame formats having to be provided or, if only one, sufficiently large illuminated frame format is used, it not been possible to correctly frame relatively small screens and possibly having to accept dazzling phenomena and relatively poor visibility. Irrespective of this, the arrangement of the lighting means has to date been anything but optimum. Dazzling effects affecting the viewer of the screen or the operator of the gaining device accompany poor illumination and a low lighting effect.

The object of the present invention is to provide an improved illuminated frame system of the kind described in the introductory part and to provide an improved gaming device comprising an illuminated frame system of this kind, which illuminated frame system and device avoid the disadvantages of the prior art and develop said prior art in an advantageous manner. One particular aim is to provide an illuminated frame system which is cost-effective to produce and may be used in a simple manner for different screen formats and sizes and which allows high illumination intensities and bright illumination, without dazzling, a viewer of the screen and impairing the visibility of the display on the screen.

SUMMARY OF THE INVENTION

According to the invention, this object is achieved by an illuminated frame system as claimed in claim 1, and also by a gaming device as claimed. Preferred embodiments of the invention are the subject matter of the dependent claims.

It is therefore proposed to shade or blank-off the lighting means in the direction of the frame interior, so that the light which is output by the lighting means is kept away from the frame interior which is framed by the frame and in which the display apparatus is arranged in the intended manner, and said light is emitted into the half-space which is situated in front of the frame front side substantially entirely away from the frame front side. According to the invention, shading means for shading the frame interior from light which is emitted by the lighting means are associated with the lighting means which are provided on the frame. Owing to said shading means, light which is emitted by the lighting means is not incident in said frame interior, but rather may be emitted substantially entirely in the direction of the frame front side. An illuminated frame system with a high illumination intensity and bright illumination and therefore good visibility is created in this way, without impairing the visibility of the display image by stray light and light reflections, even when bright lighting means with high powers are used.

Said shading means may be of different designs in principle. According to one advantageous embodiment of the invention, the shading means may be provided on the frame, in particular may be formed by a frame section or form a frame part which blanks-off or shades the lighting means in the direction of the frame interior. A shading edge which extends between the lighting means and the frame interior may preferably be fitted to the frame, for example in the form of an elongate profile strip or profile edge on the frame. As an alternative or in addition to shading means of this kind on the frame, shading means may also be fitted to the lighting means themselves, for example in the form of a shading edge which is fitted to the lighting means and may be fastened to an LED holder or lighting means holder or may be integrated therein.

In particular, the lighting means may be arranged in a recessed manner in the frame in such a way that the light which is output by the lighting means is kept away from the frame interior which is framed by the frame and is emitted substantially entirely in the direction of the frame front side. Advantageously, at least one frame part has a groove-like profile recess, which is open in the direction of the frame front side, for accommodating the lighting means and/or arranging said lighting means in a recessed manner, wherein the lighting means are arranged in blanked-off manner with respect to the frame interior in which the display unit is intended to be arranged, so that the light which is emitted by the lighting means is not incident in said frame interior, but rather may be emitted substantially entirely in the direction of the frame front side.

The lighting means of the illuminated frame system may advantageously be arranged in a recessed manner in a plurality of and/or all frame parts. To this end, the frame parts may have a preferably groove-like profile recess, in particular in the form of a slot-like profile depression which extends away over a plurality of or all frame parts and in which said lighting means may be arranged. In this case, said profile recess may be provided so as to run around (extend circumferentially) over the entire frame, so that the lighting means may be positioned in a variable manner in the desired positions. The preferably approximately slot-like profile recess may be formed, in particular, in the frame front side and be designed such that it is open in the direction of the half-space which is situated in front of the frame front side, so that the lighting means which are accommodated in the profile recess may (shine) radiate light into said half-space away from the frame from side.

In an advantageous embodiment of the invention, a continuous lighting means strip, for example in the form of an LED strip, may be provided over the interfaces between the frame parts and be mounted on the frame.

The frame parts may advantageously each comprise a convex profile section which projects in the direction of a frame front side, that is to say in the direction of a screen viewing person, and in which said profile recess may be designed to accommodate the lighting means.

Owing to the provision of a profile recess of this kind, the lighting means may be arranged such that they are blanked-off in the direction of a screen which is arranged in the frame interior, so that an undesired incidence of light from the lighting means onto the screen is avoided. Accordingly, the visibility and the contrast of the screen display remain of high quality.

As an alternative or in addition to a profile recess of this kind, the frame parts may be provided, as already mentioned, with a shading edge which is associated with the lighting means, in order to blank-off the lighting means in the direction of the frame interior. Said shading edge may be designed, for example, in the form of a convex, strip-like profile contour. If, in the abovementioned manner, a recessed arrangement of the lighting means or a profile recess for accommodating the lighting means in the frame parts is provided, the flank of the profile recess, which flank is arranged in the direction of the frame inside, may serve as a shading edge and/or be of corresponding form, in particular by virtue of a sufficient height, in order to blank-off the lighting means in the direction of the frame interior and a screen which is arranged in said frame interior.

Arrangement of the lighting means in a manner blanked-off in the direction of the frame interior prevents light which is emitted by the lighting means being able to be incident in said frame interior. As a result, firstly undesired reflections on the screen are avoided and a sufficiently high contrast of the screen is ensured. Secondly, the light which is output by the illuminated frame also does not fall directly into the eyes of a screen viewing person.

In an advantageous embodiment of the invention, the lighting means are arranged in a blanked-off manner on the frame in such a way that the eyes of a screen viewing person standing in front of the screen as intended may not look directly into the lighting means or light which is output by the lighting means does not fall directly into the eyes of the screen viewing person.

Said frame interior, which is blanked-off (shaded) with respect to the lighting means by the shading means, comprises at least the region which is framed by the frame and in which the display unit is to be arranged as intended, that is to say at least the frame plane which passes through the screen surface and is defined by the frame pans, and may advantageously also extend or project to a certain extent beyond the frame contour toward the front beyond the frame front side in the direction of the viewer position, for example in the form of an interior cylinder or prism or cone which is bounded by the frame and of which the main axis corresponds substantially to an intended viewing axis onto the display unit or to a perpendicular onto the frame plane which is defined by the frame parts.

Owing to the shading of the lighting means in the direction of the screen and/or the viewing person, lighting, means which generate high light intensities may be used. As a result, good visibility and therefore a high level of attraction for potential customers may be achieved in a far range, for example in a casino, while the illumination force of the frame system is nevertheless not found to be disruptive in the near range. The illuminated frame system therefore forms a simple and nevertheless effective means for advertising, which means is able to attract interested users and potential customers from a distance, without having a disruptive effect in the near range.

In order to direct the light which is output by the lighting means which are fitted to the frame in a targeted manner in the desired direction, an optical system, in particular in the form of a lens and/or reflector arrangement, which captures at least a portion of the light which is output by the lighting means and emits said light in a targeted manner in a predetermined emission direction, in particular substantially perpendicular to the frame plane away from the frame front side, may be associated with the lighting means. In this case, the optical system may be created in such a way that the emitted light widens around said emission direction in the form of a cone or wedge, for example at an angle of 10° or another desired widening angle.

In particular, according to a further embodiment of the invention, at least one reflector which captures the light from the lighting means and deflects or emits said light in the desired radiation direction may, in particular, be arranged on the frame in an embodiment of the invention. Depending on the illumination task, this emission direction may be oriented differently, wherein a plurality of reflectors which emit light in different directions may also be associated with a plurality of lighting means in order to partially or selectively illuminate different regions.

In order to achieve even greater light intensities or illumination intensities at some distance from the illuminated frame system without shading a viewer standing close to the screen or illuminated frame system, the at least one reflector may, in an embodiment of the invention, be designed and arranged relative to the lighting means in such a way that the light which is captured by the reflector is emitted into a region or half-space, in front of the frame, away from the frame front side and/or is emitted away from the display unit which is framed by the frame. In particular, the reflector may emit the light in a direction substantially perpendicular to the frame plane, wherein the emitted light may widen in the manner of a cone or wedge of light when emitted by the reflector. Depending on the desired propagation of light, said emission direction may also have deviations of ±5° or ±10° or else ±25° or even greater deviations from said perpendicular to the frame plane.

Owing to the use of reflectors, the lighting means may be arranged more freely and more independently of the desired emission direction, both in terms of the position and the orientation of said lighting means. In particular, it is possible in this way to keep primary light from the lighting means away from the framed screens or the screen viewing persons, and to direct secondary light, that is to say light reflected by the reflectors, in a targeted manner in the desired direction.

In a further embodiment of the invention, said at least one reflector may be arranged in the profile recess in which the lighting means are accommodated in a recessed manner in particular, an outer flank of the profile recess, that is to say a flank of the profile recess which is situated on the outside of the frame with respect to the lighting means, may be of reflective design or be provided with a reflector.

In an advantageous embodiment of the invention, the lighting means may be arranged in such a way that a main axis of the light which is output by the lighting means points outward substantially radially away from a frame center, wherein the main axis may extend, in particular, approximately perpendicular to the longitudinal axis of the frame part on which the lighting means is arranged, and at least approximately parallel with respect to the frame plane. Depending on the frame configuration, deviations of ±10° or else ±25° from said orientation of the main axis may be provided. When LEDs are used as lighting means, said LEDs emit the light itself into a half-space of which the main axis usually passes through the LED support or the LED circuit board in a perpendicular manner. In order to deflect the light which is then shone in the incorrect direction per se in the desired emission direction, a reflector may comprise a reflector area which extends in the frame circumferential direction and is inclined with respect to said main axis. Said reflector area may be formed by the outer flank of the profile recess.

In this case, a modular design may be provided for the frame which may be made up in a variable manner from a plurality of exchangeable modular elements. In order to be able to cost-effectively produce and simply mount frames of different formats and/or different sizes and/or shapes for various screens, the frame is advantageously composed of frame modules which are compatible with one another, may be exchanged for one another and may be put together in different configurations, wherein the frame parts are connected to one another in order to obtain a fixed frame structure. In particular, the frame is composed of a plurality of frame parts which connect to one another and have, at their end sections, complementary connecting means which may engage in an interlocking manner. Owing to the complementary connecting means at the end sections of the frame parts, said frame parts may be exchanged for one another, so that different frames may be configured and mounted in a simple manner with a limited number of frame parts.

In this case, it is possible, in principle, to configure different frame shapes, for example U-shaped or else only L-shaped frames, which are open on one or more sides. In particular however, frames which are closed circumferentially in the manner of a ring may be configured, said frames then being able to frame one or more screens on all sides.

In order to allow simple mounting but, at the same time, achieve a stable frame structure, said connecting means may comprise, in an embodiment of the invention, plug-type profile sections which may be plugged together at the end sections of the frame parts, so that the frame pans may preferably be joined to one another in a simple manner without tools and may be connected to form a fixed, mechanically stable structure. It may optionally be possible to provide further connecting means in addition to said plug-type profile sections, for example screws or quick-action clamping, means such as clamping holders, wherein said connecting means may optionally also be operated by an appropriate tool, for example a screwdriver.

In order to achieve a stable connection, said plug-type profile sections may have cross-sectional contours which are matched to one another as viewed in the cross section of the frame, so that two plug-type profile sections may areally engage with one another with an accurate fit in the plugged-together state. In order to obtain a torsionally stiff connection, said plug-type profile sections may be designed in a three dimensionally curved or convex manner and bear areally against one another by way of three-dimensional engagement contours. In particular, the plug-type profile sections may be designed as hard-chine contours, the longitudinal direction of the hard chine of said contours running in the plugging direction. The plug-type profile sections are advantageously designed in such a way that they may be plugged together in the frame longitudinal direction and/or frame circumferential direction.

In an advantageous embodiment of the invention, the plug-type profile sections are contoured in such a way that the frame parts may be joined to one another without seams and/or without steps at least at the front side and/or the visible side. Although adjacent frame parts which are connected to one another overlap by way of their plug-type sections, the plug connection is advantageously designed such that the frame contour or the profile contour continues in a continuous manner over the interface of the two frame parts.

In an embodiment of the invention, a respective frame part may comprise a step-like profile projection in the region of its plug-type profile section, a visible profile section of said frame part merging with said plug-type profile section at said step-like profile projection. The ping-type profile section advantageously continues the profile contour of said visible profile section in a manner offset in the form of a step, so that the plug-type profile section may be plug-connected with an accurate fit behind the rear side of the visible profile section of an adjacent frame part and in the process engages areally with an accurate fit with said profile section of the adjacent frame part.

The plurality of frame parts may comprise differently shaped frame parts in order to be able to generate different frame shapes. In particular, straight and bent frame parts, in particular frame parts which are curved and/or bent away in the shape of an arc, may be used and combined with or joined to one another.

According to a further, possibly independent aspect of the invention, the bent frame parts may be produced from a different material to the bent frame parts. As a result, different material properties may be used and, for example, tolerances may be compensated for or better form-fitting connections may be achieved, for example by using hard and soft and/or rigid and elastic materials. Furthermore, production for the different shapes of the frame parts may be simplified.

In particular, the bent frame parts, preferably frame parts which are in the shape of an arc, may be produced from plastic, while the straight frame parts may be designed as metal parts. In an embodiment of the invention, the round or arc-shaped frame parts are injection-molded from plastic, while the straight frame parts may be designed as bent sheet-metal profiles or sheet-metal edge profiles.

If, in the abovementioned manner, the plug-type profile sections are formed by step-like profile projections, the bent frame parts and/or frame parts which are produced from plastic may have plug-type profile sections which are formed with step-like profile projections, preferably at both of their end sections, while the straight frame parts and/or frame parts which are produced from metal may have plug-type profile sections without profile projections.

Owing to the modular design of the frame, the illuminated frame system is provided with a high degree of variability which makes it possible for the illuminated frame system to be selectively assigned to an individual device or a group of devices, in particular a group of gaming devices. By way of example, the illuminated frame system may be fitted directly to an individual, separate gaming device given a corresponding configuration of its frame parts. However, given a correspondingly different configuration of the frame parts, the illuminated frame system may also be associated with a group of gaming devices, for example may frame one or more large screens on which a game which is intended for several players or gaming devices, for example in the form of a bonus game, may be displayed.

In this case, the illuminated frame system may be arranged in such a way that the gaming devices are oriented at the front in relation to the illuminated frame, in particular in such a way that the user positions of the gaming devices are situated in the blanked-off inner region of the frame. As an alternative or in addition, the illuminated frame system may however, also be associated with an island of devices, for example in such a way that a group of devices, in particular gaming, devices, may be arranged so as to form an island or ring in relation to one another, wherein one or more screens are jointly associated with the plurality of devices and said screen or screens are framed by one or more illuminated frame systems. By way of example, screens which are oriented in the direction of opposite sides in the center of the island may be arranged, for example, back-to-back and be framed by an illuminated frame system which is then advantageously designed so as to provide illumination in the direction of opposite sides or is provided with lighting means which shine light in the direction of opposite sides, or by a plurality of illuminated frame systems. As an alternative or in addition, a plurality of screens which are oriented in the direction of different sides may also be assigned to a group of devices of this kind, it then being possible for said screens to be framed by corresponding illuminated frame systems which are likewise oriented in the direction of different sides, for example in an annular or polygonal manner.

In an advantageous embodiment of the invention, the illuminated frame system forms a self-supporting structure which forms a dimensionally stable unit neither by fastening to a gaming, device housing nor to a screen which is to be framed. In an embodiment of the invention, at least some of the frame parts may advantageously comprise plate-like holding flanges which may project from the three-dimensionally contoured frame profile sections in the direction of the frame interior and advantageously may be connected to one another in order to provide the frame parts which are connected to one another with additional structural strength. In particular, said holding flanges may have complementary connecting means which may engage in an interlocking manner and by means of which the holding flanges of different frame parts may be fixedly connected to one another. By way of example, said connecting means may comprise interlocking parts which may be contoured in the manner of a key and keyhole or in the manner of puzzle part connection pieces and may be locked in an interlocking manner.

In the connected state, said holding flanges may extend at least approximately in as common plane which is oriented at least approximately parallel to the frame plane, advantageously in a coplanar manner with respect to the frame plane. This plane, which is jointly defined by the holding flanges, may at the same time serve as an abutment face for a screen which is to be framed, in particular if said screen is a flat screen.

As an alternative or in addition to the connection of said holding flanges to one another, said holding flanges may be fastened to a central, common frame support which may advantageously extend in the frame interior which is enclosed by the frame. Said frame support may be in the form of, for example, a support profile, for example framework profile, but possibly also in the form of a chassis-like shaped part.

In an embodiment of the invention, a floor stand may be fitted to the frame, it being possible for the illuminated frame system to be erected on the floor in a freestanding manner in space by said floor stand. As an alternative or in addition, possibly after removal of said floor stand, the frame may also have wall connection means in order to be fastened to a wall. Once again as an alternative or in addition, the frame may comprise panel connection means in order for example to be mounted on a housing panel of, for example, a gaming device.

In an embodiment of the invention, fastening means for fastening at least one screen may be provided on the frame, wherein said fastening means may be provided on the frame support, which is arranged in the frame interior, in a further embodiment of the invention.

BRIEF DESCRIPTION OF THE DRAWINGS

The invention will be explained in greater detail below with reference to a preferred exemplary embodiment and associated drawings, in which.

DETAILED DESCRIPTION

Figure 1:
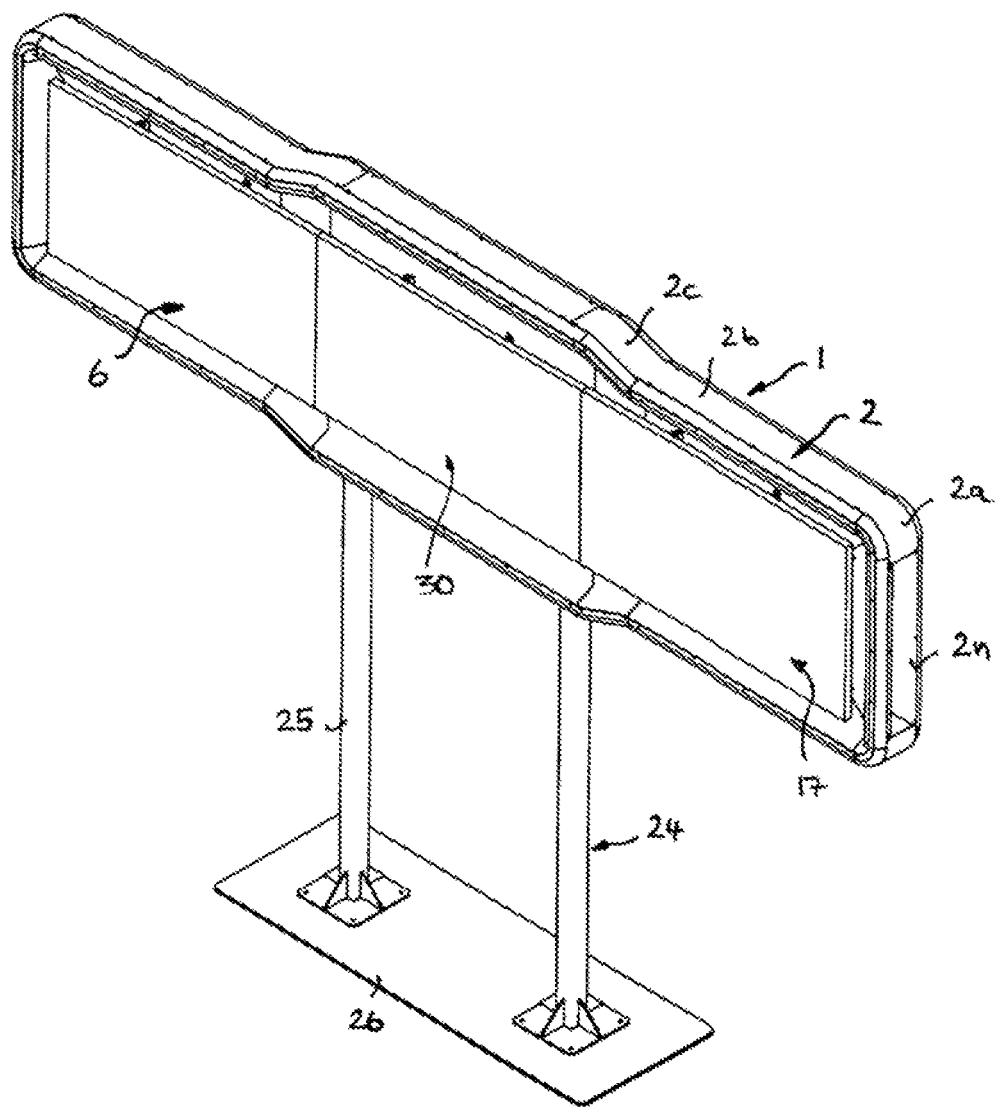
FIG. 1: shows a schematic, perspective illustration of an illuminated frame system according to an advantageous embodiment of the invention in which the frame surrounds three flat screens which are arranged next to one another.
Figure 2:
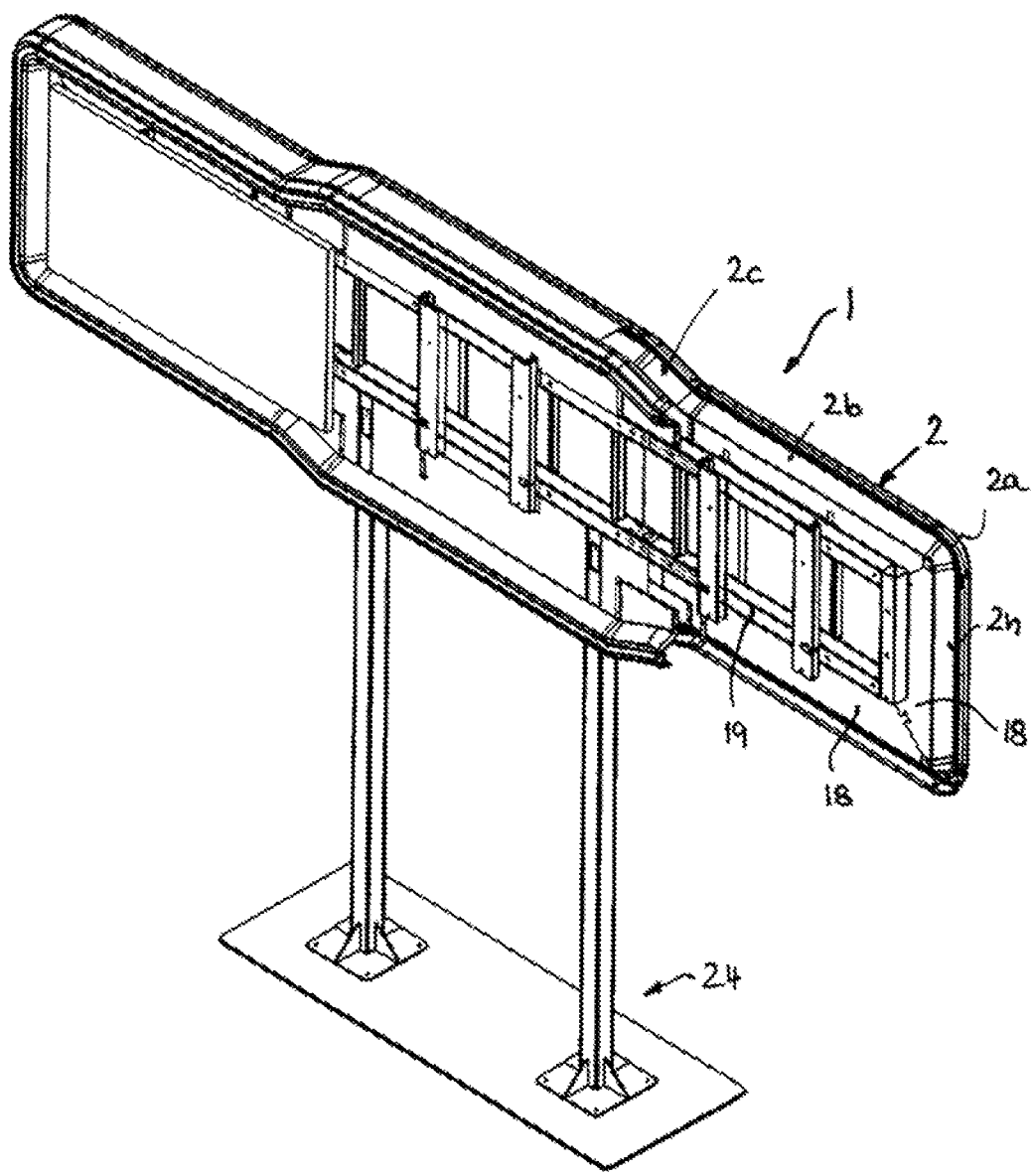
FIG. 2: shows a schematic, perspective and partially skeletonized illustration of the illuminated frame system similar to FIG. 1, wherein a frame support which is arranged in the frame interior and to which the frame parts are fastened is shown.

As shown in FIGS. 1 and 2, an illuminated frame system 1 may be designed in the form of a self-supporting structure and have a floor stand 24 with which the illuminated frame system 1 and possibly screens 6 which are fastened to the floor stand 24 may be erected on the floor in a freestanding, manner. By way of example, said floor stand 24 may comprise two supporting feet 25 which are connected to a base plate 26. As an alternative, the illuminated frame system 1 may have wall fastening means for fastening to a wall or may be mounted on a gaming device console.

As shown in FIG. 2, the illuminated frame system 1 may comprise a frame support 19 which, as in the present case, is in the form of for example, a skeletal structure or may be formed by a bar frame. The frame support 19 is fastened to said floor stand 24 and supports the frame 2 which frames one or more screens 6.

Said frame support 19 may form a planar, flat structure and be arranged in the frame interior which is surrounded by the frame 2, wherein the frame support 19 may advantageously extend in the plane which is defined by the frame 2 or be arranged parallel to said plane.

The at least one screen 6 may be fastened to said frame support 19 but possibly, as an alternative or in addition, may also be fastened to the frame 2, which frame 2 is mounted on said frame support 19.

As shown in FIGS. 1 and 2, the frame 2 may have, in principle, an approximately rectangular contouring which is closed in the manner of a ring, wherein, however, said frame 2 does not have to be exactly rectangular or be composed of four exactly straight limbs, but rather may also comprise rounded portions and convex or kinked sections.

Said frame 2 is advantageously composed of a plurality of modular frame parts 2a, 2b, 2c, 2n, wherein said frame parts 2a, 2b, 2c, . . . , 2n may advantageously comprise frame parts 2a which are curved in the form of an arc or contoured in a rounded manner, frame parts 2c which are bent away and/or bent or kinked in opposite directions, in particular in the shape of an S, and straight frame parts 2b. Owing to frame parts with straight, curved and/or kinked longitudinal axes, differently shaped frames 2 may be assembled, it being possible for the contouring of said frames to be matched to the screens which are to be framed. As shown in FIG. 2, the frame parts 2a with a longitudinal axis which is contoured in the form of an arc may form the rounded "corners" of the frame 2, while frame parts 2c with longitudinal axes which are contoured in a manner kinked in opposite directions or in the shape of an S may be incorporated in central sections of the frame 2 in order to form convex frame portions.

The frame parts 2a, 2b, 2c, . . . , 2n have, at their end sections 7 and 8, connecting means 9 by means of which the frame parts may be directly connected to one another. Said connecting means 9 are advantageously plug-type connecting means or may be in the form of plug-type profile sections 10 and 11 which, by being plugged together, connect two adjacent frame parts to one another in an interlocking manner and hold said frame parts together in a rigid manner.

Figure 3:
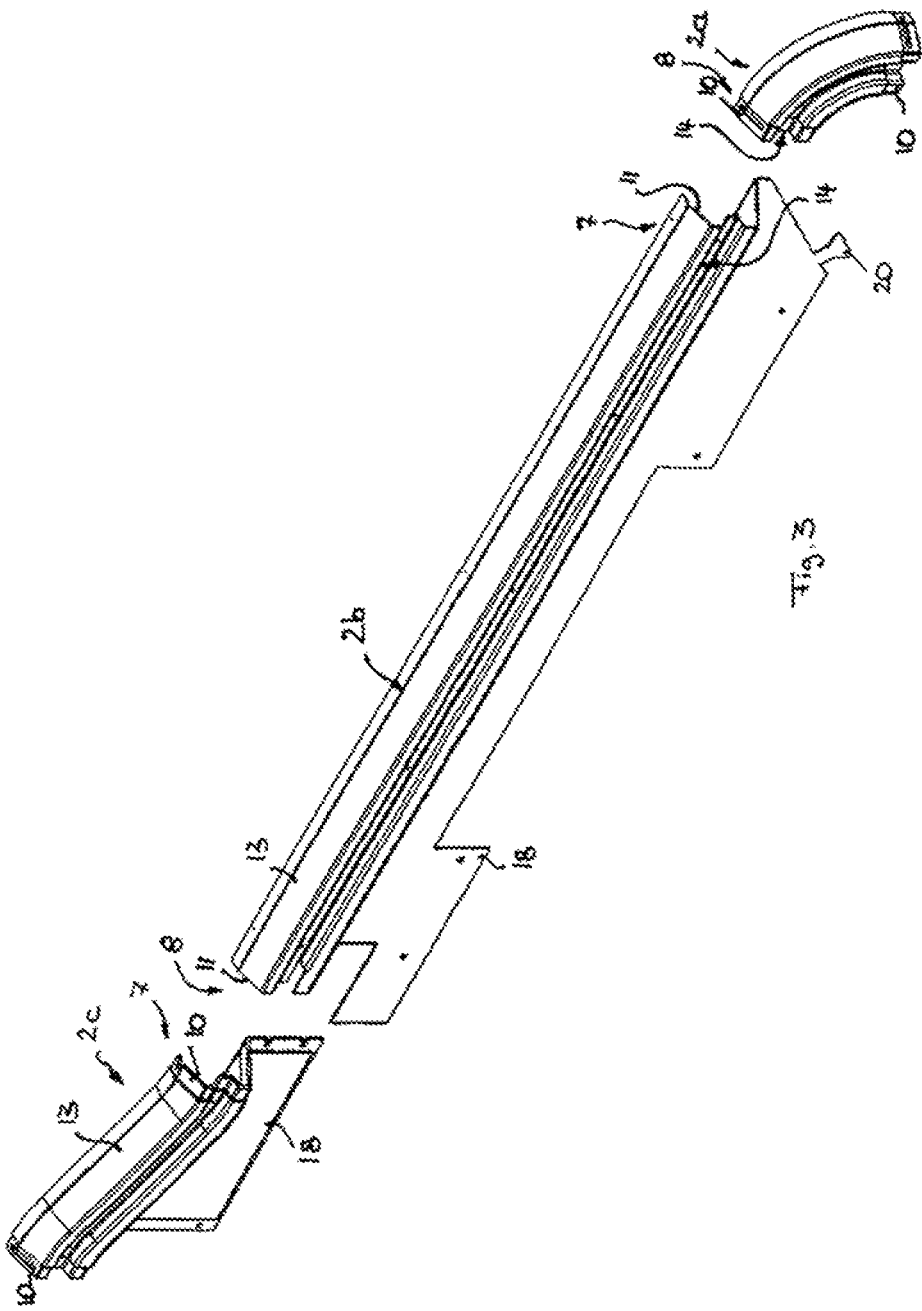
FIG. 3: shows a perspective exploded illustration of three of the flame parts, which illustration shows the plug-type profile sections of the frame parts by means of which the frame parts may be connected to one another.
Figure 4:
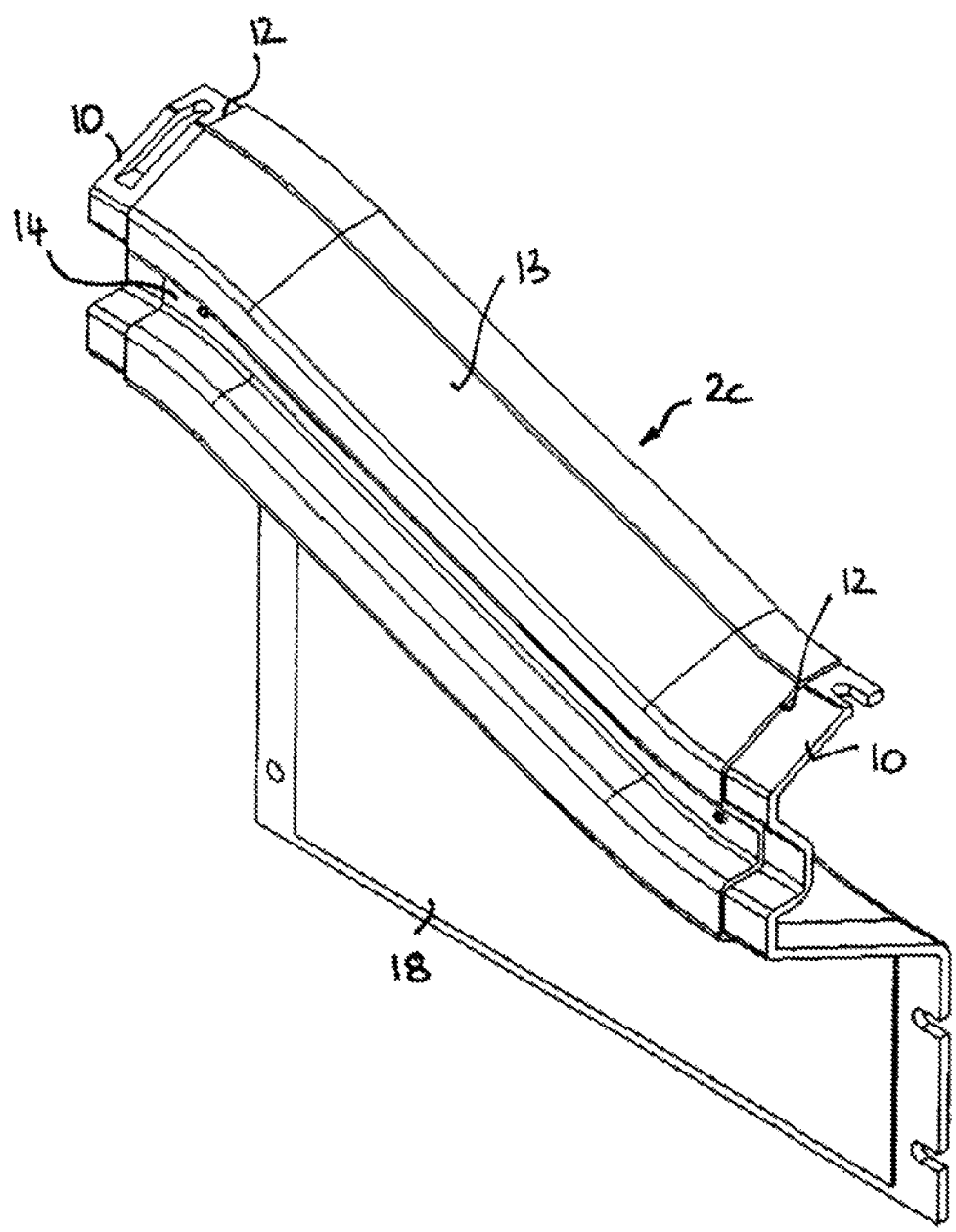
FIG. 4: shows a perspective individual illustration of a frame part which is curved in the shape of an S, which illustration shows the plug-type profile sections which are integrally formed on the end sections and are offset by a profile projection.
Figure 6:
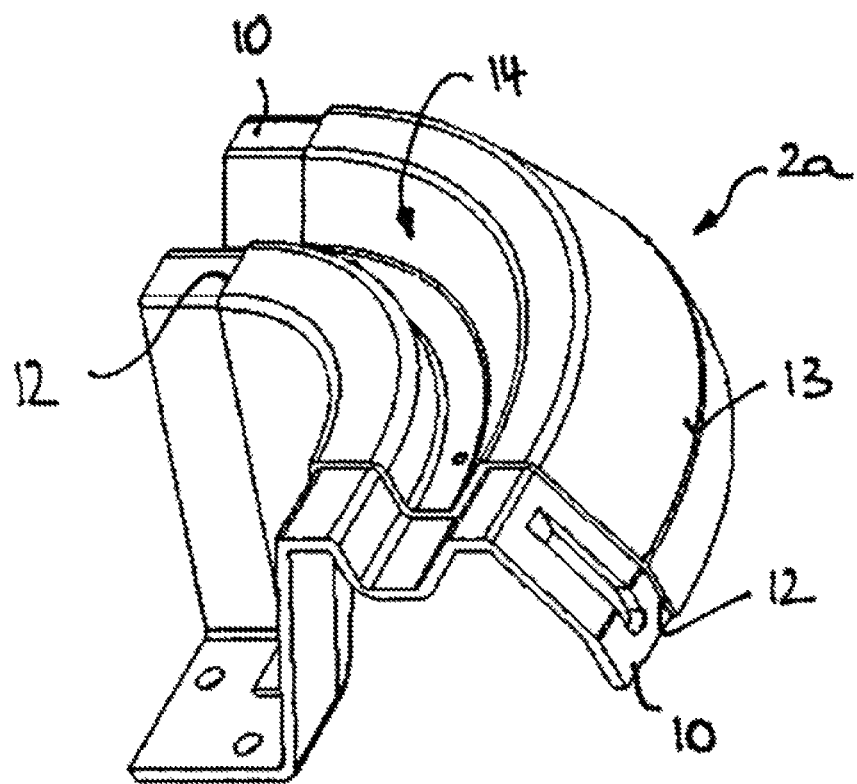
FIG. 6: shows a perspective individual illustration of a frame part which is curved in the form of an arc, which illustration shows the circumferential profile recess for accommodating the lighting means.

As shown in FIG. 3 and also in FIGS. 4 and 6, said plug-type profile sections 10 may be offset in relation to the adjoining frame profile sections at the rounded or kinked frame parts 2a and 2c by a profile projection 12, in particular may be offset in the direction of a frame rear side. However, in this case, said plug-type profile sections 10 continue the contouring of the adjoining frame profile sections or correspond to the adjoining frame profile sections in profiled cross section. As a result, said plug-type profile sections 10 may be placed areally with an accurate fit on the rear side of the frame profile of the adjacent straight frame part 2b or be plug-connected to the straight frame part 2b at the rear face. In the case of said straight frame part. 2b, the end sections of said frame part form the plug-type profile sections 11 which are formed by the profiling of the frame part 2b without a profile projection In the assembled state, the frame parts 2a, 2b, 2c, . . . , 2n form a continuously uniform frame profile which passes, in particular, in a step-free manner and "smoothly" over the interfaces between the frame parts and which advantageously may form a convex portion in a three-dimensional manner in the direction of the frame front side, that is to say in the direction of the viewer of the screen, or may be pre-curved in a convex manner, cf. FIG. 1 and FIG. 2.

However, in this case, the circumferential profile section 13 of the frame 2 may also be of convex and, at the same time, concave design as viewed in cross section. In particular, a channel-like or slot-like profile recess 14 in the form of a profile recess may be made in the profile section 13 which forms a convex portion in the direction of the frame front side, it being possible for said profile recess to run or be designed uniformly over the entire circumference of the frame 2, cf. FIG. 7 in conjunction with FIG. 1.

Lighting means 3, preferably in the form of a plurality of LEDs which are arranged in rows, are accommodated or arranged in said channel-like profile recess 14, wherein said LEDs 4 may be arranged on a strip-like mounting board or may be part of an LED strip which is arranged in said profile recess 14.

Figure 7:
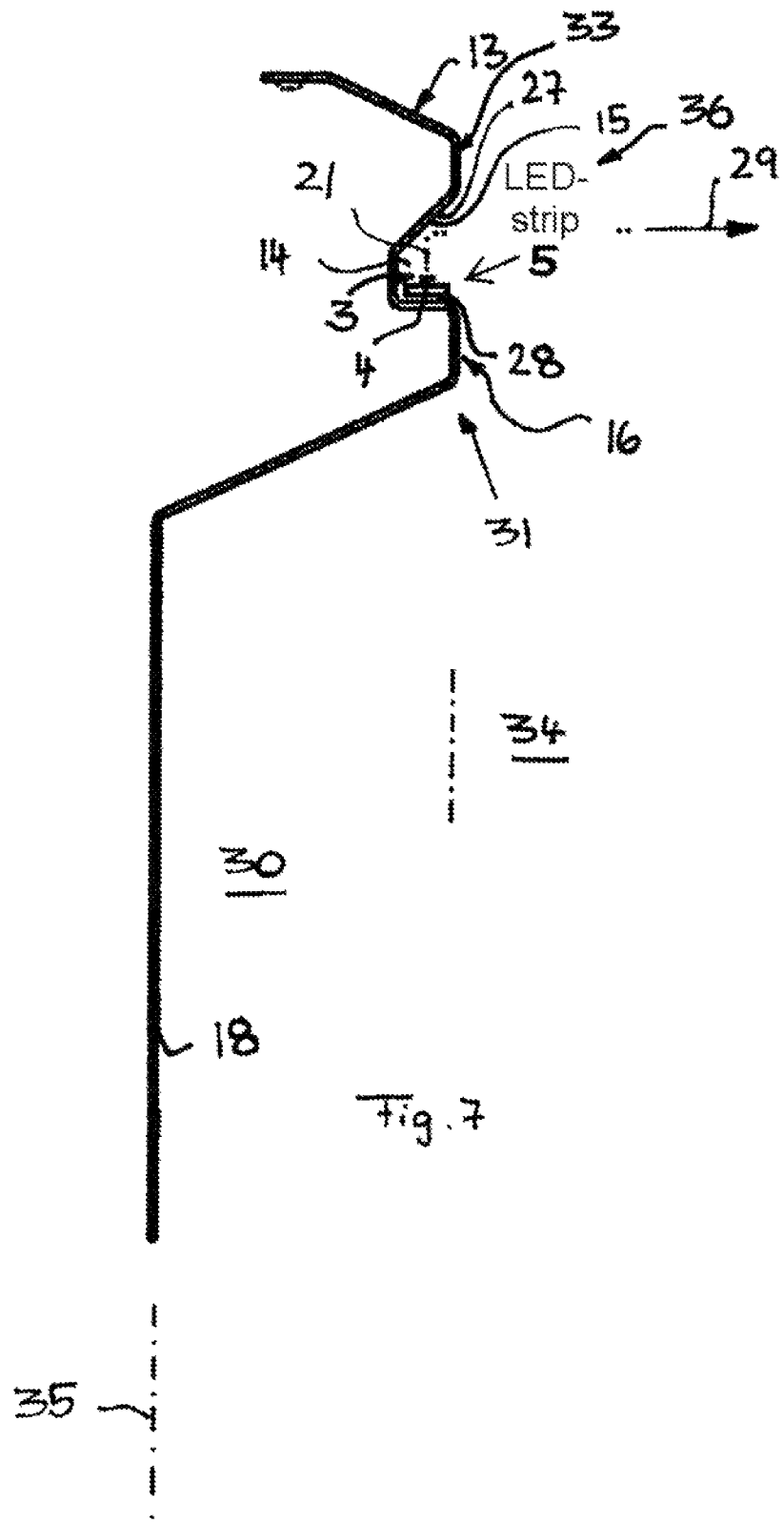
FIG. 7: shows a sectional view through a frame part, which view shows the convex frame profile contouring and the groove-like profile hollow formed therein and also the arrangement of the lighting means in this profile hollow.

As shown in FIG. 7, the lighting means 3 may in this case be arranged in the profile recess 14 in such a way that a main axis 21 of the light which is emitted by the LEDs 4 runs outward transverse to the frame circumferential direction, in particular approximately radially outward, and/or extends at least approximately parallel to the frame plane 35 which is defined by the frame parts 2a, 2b . . . 2n. Therefore, the lighting means 3 are arranged in such a way that they (shine) radiate light outward away from the framed frame interior.

In this case, an optical system 36, which may comprise a lens and/or a reflector, may be associated with the lighting means, the light which is output by the lighting means being captured and being emitted substantially entirely in a predetermined emission direction 29 by means of said optical system, wherein said emission direction may be oriented, in particular, approximately perpendicular to the frame plane 35 away from the frame front side, cf. FIG. 7.

In this case, the lighting means 3 may in particular, be arranged on an inner flank of the groove-like profile recess 14 and shine light onto the opposite, outer flank 27 of the profile recess 14. Said outer flank 27 may be in the form of a reflector 15, for example by virtue of a mirrored or reflective surface coating. Accordingly, the reflector 15 is associated with a plurality of lighting means. In this case, the reflector 15 may be formed in the manner of a flat mirror, but as an alternative may also have a relief-like surface contouring which is matched to the lighting means arrangement or raster distribution, for example in the form of a hollow raster or tray raster, so that each lighting means 3 is assigned its reflector area.

However, as an alternative or in addition, individual reflectors may also be associated with the lighting means 3, it being possible for said individual reflectors to be fitted, for example, directly to the lighting means support and to be curved in the form of a shell around the lighting means. Particularly when LEDs or other small, in particular punctiform, light sources are used, the light sources may be framed by, for example, cup- or flute-like reflectors which may be fastened to an LED circuit board or to another light source holder by means of a sleeve-like mounting holder, as is shown, for example, in DE 102 50 383 A1. In this case, the reflectors may have a passage recess in the reflector base, it being possible for the LED or, in general, the light source to be inserted into the reflector interior and connected to the LED printed circuit board through said passage recess. Reference is made to said document DE 102 50 383 A1 in respect of the fastening and design of reflectors of this kind which are individually associated with an LED, the content of said document to be considered part of the present disclosure in this respect.

In order to achieve an emission characteristic which differs from the usual emission characteristic of LEDs which themselves often shine light into a half-space more or less in a semi-spherical manner, and which is matched to the frame conditions, a reflective beam former may be associated with the LEDs or possibly also other lighting means 3, as is known from WO 2013/041137 A1 for example. In this case, the beam former may have light-passage or beam-forming, openings which are of reflective design and by the inclination and length of which the produced emission characteristic, for example in the form of a specific emission angle or a deflection of the focus of the angular distribution of the emitted cane of light, may be adjusted. Reference is made to said document WO 2013/041137 A1 in respect of the design and arrangement of a reflective beam former of this kind and the assignment of said beam former to the LEDs or lighting means 3, the content of said document to be considered part of the present disclosure in this respect.

If the frame 2 has a profile recess 14 in the manner described above, a reflector 15 being fitted to the profile or frame flank 27 of said profile recess, the frame flank 27 on which the lighting means 3 shine light or the reflector 15 which is fitted to said frame flank may advantageously be oriented in such a way that the reflected light is emitted substantially perpendicular to the plane, which is defined by the frame 2, to the frame front side, as is clear from the arrow for the emission direction 29 in FIG. 7.

As shown in FIG. 7, the profile recess 14 in which the lighting means 3 are arranged may have differently contoured flanks 27 and 28 as viewed in cross section. In particular, the inner flank 28 may run almost approximately perpendicular to the frame plane which is defined by the frame 2, while the outer flank 27 may be inclined at an acute angle to said frame plane, for example at an angle of approximately 30° to 60°.

As shown in FIG. 7, the lighting means 3 are arranged in a manner blanked-off from the frame interior 30 being enclosed by the frame 2, so that the light which is output by the lighting means 3 may not fall onto the screen 6 in the frame interior 30. The profile edge which is situated in the direction of the frame interior 30 in front of the profile recess 14 forms a shading edge 16 which blanks-off the lighting means 3 from the frame interior and the screens 6 being arranged therein.

Figure 8:
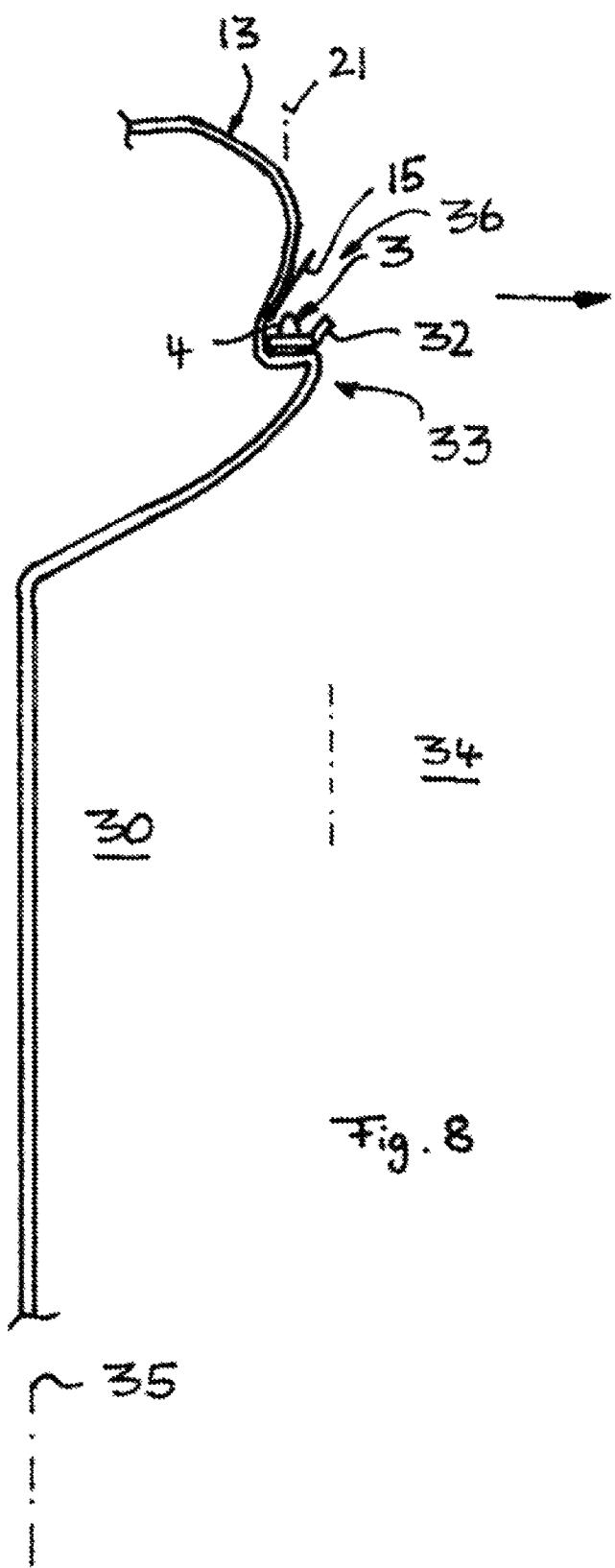
FIG. 8: shows a sectional view through a detail of a frame part similar to FIG. 7, which sectional view shows a shading edge which is directly associated with the lighting means.

As shown in FIG. 8, a shading edge 32 may also be directly associated with the lighting means 3, it being possible for example for said shading edge to be fastened directly to the printed circuit board or to the lighting means holder on which the lighting means 3 is seated or may be seated on the lighting means 3 itself. The shading edge 32 may shade the frame interior 30, as explained above.

The blanked-off arrangement of the lighting means 3, which arrangement is recessed in the frame 2, and/or the control of the light output by the lighting means 3, which control is achieved by the reflector or possibly another optical means, such as a lens for example, may, in particular, be provided in such a way that the illuminated frame has a relatively high illumination force and/or relatively high perceptibility and/or relatively high light intensity in the far range and a relatively low illumination force and/or relatively low perceptibility and/or relatively low light intensity in the near range in a predetermined screen viewing person position for viewing a framed screen.

In particular, the blanked-off inner region may extend so far in the direction of the frame front side or beyond the frame front side 33 that a viewer who is positioned in the intended viewer position may not look directly into the lighting means which is recessed in the frame and/or that only a small fraction of the output light may fall on the viewer. Depending on the size of the illuminated frame system and the display apparatus which is framed by said illuminated frame system, said viewer position may be at a distance of for example, 0.3 m to 2 m from the illuminated frame system, wherein even relatively large viewer position distances of, for example, 5 m or else 10 m may be provided in the case of very large illuminated frame systems.

In particular, the lighting means which are arranged in the frame may emit a ring of light starting from the frame or the output light may propagate in a ring which cuts out the frame interior, at least in the direction of the viewer position, wherein the ring of light may expand or the ring thickness may increase as the distance from the frame increases, so that, as viewed in the far range or from a distance, the illuminated ring is fully and clearly visible with a high light intensity.

The frame parts 2a, 2b, 2c, . . . , 2n, from which the frame 2 is assembled, are advantageously not all produced from the same material. In particular, the frame parts 2a and 2c with a bent longitudinal axis may be produced from plastic, in particular may be plastic injection-molded parts, while the frame parts 2b with a straight longitudinal axis may be produced from metal, in particular may be in the form of bent sheet-metal profiles or sheet-metal edge profiles.

Figure 5:
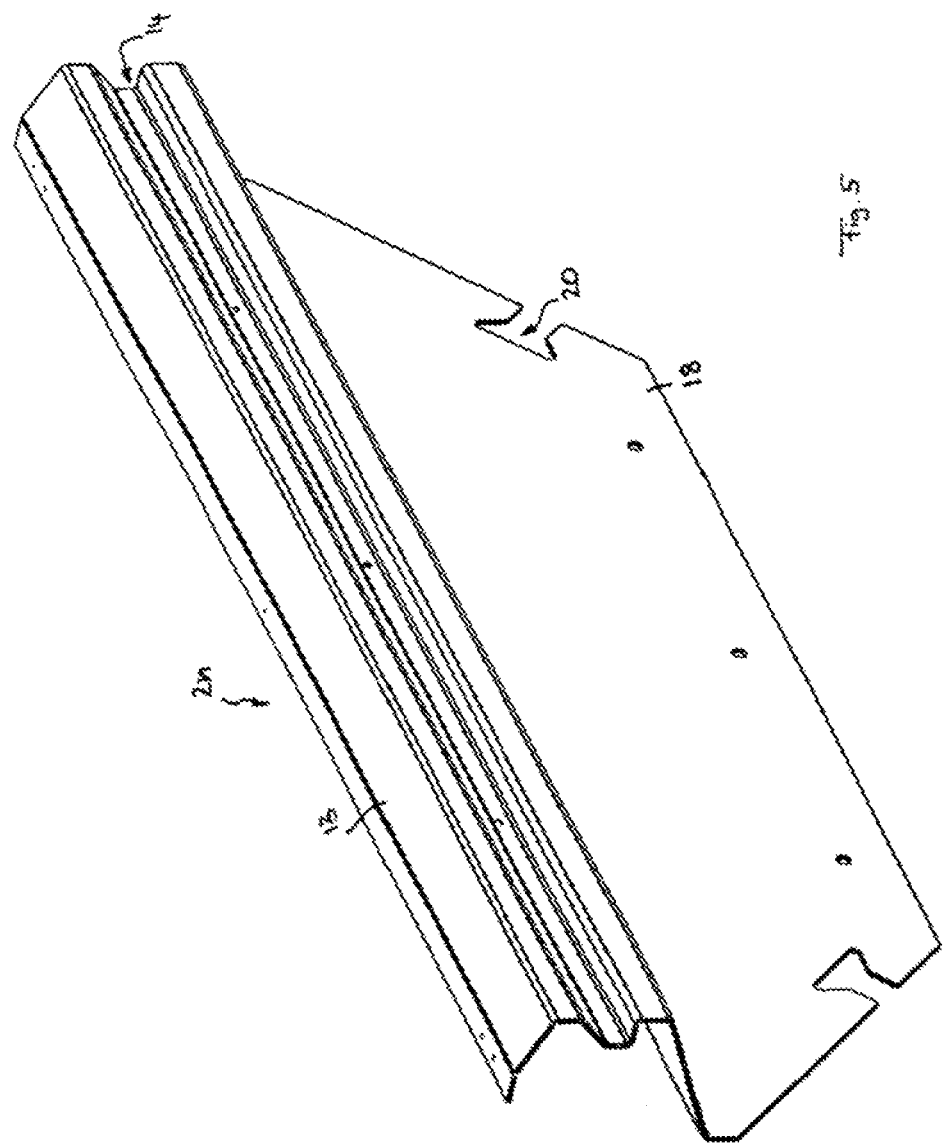
FIG. 5: shows a perspective individual illustration of a straight frame part, the end sections of said frame part themselves forming the plug-type profile sections without a profile projection.

At least some of the frame parts 2b and 2c may preferably comprise flat holding flanges 18 which project radially inward from the convexly contoured profile sections 13, so that they extend in the direction of the frame support 19. Said holding flanges 18 may be of plate-like design and may be arranged in a common plane when the frame parts are connected to one another. Said plate-like holding flanges 18 are advantageously connected not only to the frame support 19, but also are connected to one another, preferably by connecting means 20 which act in an interlocking manner, for example in the form of the key- and keyhole-like interlocking sections illustrated in FIG. 3 and FIG. 5.

We claim:

1. An illuminated frame system for framing a display unit comprising:
a frame on which a lighting configured to illuminate the frame is arranged, wherein the frame frames a frame interior where the display unit is to be arranged, and wherein the frame is made up of a plurality of frame parts, wherein the lighting comprises LEDs; and
a shading configured to shade the frame interior from light which is emitted by the lighting, wherein the shading is associated with the lighting, wherein said frame parts are connected to one another and have, at their end sections, a complementary connector, wherein the connector is configured to be engageable in an interlocking manner, wherein a profile recess extends in the plurality of frame parts and is open in the direction of a frame front side, wherein the profile recess is configured to arrange the lighting in a recessed manner, wherein a profile flank is configured to delimit the profile recess, and wherein the profile flank blanks-off the lighting which is recessed in the profile recess with respect to the frame interior; and
wherein the plurality of frame parts comprise at least one straight frame part and at least one bent frame part, wherein the straight and bent frame parts are produced from different materials, wherein the at least one straight frame part is in the form of a metal profile, wherein the metal profile is a bent sheet-metal profile, wherein the at least one bent frame part is in the form of a plastic profile, and wherein the plastic profile is a plastic injection-molded profile.

2. The system of claim 1, wherein the shading has at least one shading edge, wherein the at least one shading edge is located on the frame, wherein at least one of the frame parts comprises the shading edge, wherein the shading edge is in the form of a convex, strip-like profile contour, and wherein the shading edge is configured to blank-off the lighting with respect to the frame interior.

3. The system of claim 1, wherein the shading has at least one shading edge, wherein the shading edge is fitted to the lighting.

4. The system of claim 1, wherein the profile recess comprises grooves, and wherein the profile recess extends circumferentially over the entire frame.

5. The system of claim 4, wherein the frame parts each comprise a convex profile section, wherein the convex profile section is configured to project in the direction of the frame front side, and wherein the profile recess is configured to accommodate the lighting.

6. The system of claim 1, wherein the lighting is arranged in such a way that a main axis of the light which is in each case output by the lighting points outward substantially radially away from the frame interior, wherein the main axis is parallel with respect to a frame plane, wherein the frame plane is defined by the frame.

7. The system of claim 6, further comprising an optical system configured to capture and emit the light, which is outputted by the lighting, in a predetermined emission direction, wherein the emission direction is away from the frame front side and substantially perpendicular to the frame plane, and wherein the optical system is associated with the lighting means.

8. The system of claim 7, further comprising at least one reflector configured to capture the light and emit the captured light in said emission direction, and wherein the at least one reflector is provided on the frame and/or on the lighting.

9. The system of claim 8, wherein the reflector is contoured and oriented in such a way that the captured light from the lighting is configured to be emitted into a half-space and/or away from the display unit, and wherein the half-space is situated in front of the frame front side and/or away from the frame front side.

10. The system of claim 9, wherein the profile recess is configured to accommodate at least one of the lighting and a profile section, wherein the profile section is adjacent to said profile recess, and wherein the profile recess is in the form of a reflector and/or is provided with the reflector.

11. The system of claim 8, wherein the reflector comprises a reflector area, wherein the reflector area extends in the frame circumferential direction and is inclined with respect to said main axis of the light emitted by the lighting, and wherein said reflector area is formed by a flank of the profile recess in which the lighting is accommodated.

12. The system of claim 1, wherein the lighting is blanked-off in such a way and/or the light output by the lighting is controlled by an optical system in such a way that the illuminated frame system has a relatively high illumination force and/or relatively high perceptibility and/or relatively high light intensity in the far range and a relatively low illumination force and/or relatively low perceptibility and/or relatively low light intensity in the near range at a predetermined position of a screen viewing person viewing a framed screen.

13. The system of claim 1, wherein the connector of the frame parts comprises plug-type profile sections configured to plug together, and wherein the plug-type profile sections have cross sectional contours, wherein the cross sectional contours are hard-chine contours, wherein the cross sectional contours are matched to one another as viewed in the cross section of the frame, and wherein the plug-type profile sections can engage with one another with an accurate fit by being plugged together in the frame longitudinal direction or frame circumferential direction.

14. The system of claim 13, wherein a respective frame part comprises a step-like profile projection in the region of its plug-type profile section, wherein a visible profile section of said frame part is configured to merge with said plug-type profile section at said step-like profile projection, wherein the plug-type profile section continues the profile contour of said visible profile section in a manner offset in the form of a step, and wherein said plug-type profile section is configured to be plug-connected with an accurate fit at the rear behind a visible profile section of a further, adjacent frame part.

15. The system of claim 1, wherein at least one of the bent and the plastic frame parts comprises a plug-type profile section formed with a step-like profile projection, and wherein at least one of the straight and the metal frame parts comprises the plug-type profile section without the profile projection.

16. The system of claim 15, wherein at least some of the frame parts have holding flanges, wherein the holding flanges extend parallel to a frame plane, wherein the holding flanges are configured to fasten the frame parts to a frame support, and wherein the frame support extends in the frame interior, wherein the frame interior is enclosed by the frame.

17. The system of claim 16, wherein said holding flanges are each of plate-like design, wherein said holding flanges each comprise a flange connector, and wherein the flange connector is configured to engage in an interlocking manner to connect the holding flanges of different frame parts to one another.

18. The system of claim 1, wherein the frame is fitted to a floor stand by which the illuminated frame system is arrangeable on the floor in a freestanding manner in space.

19. The system of claim 1, further comprising a gaming device comprising at least one operator control terminal for at least one player and at least one screen, and wherein the screen is framed by the illuminated frame system.

20. The system of claim 19, wherein the gaming device is arranged in a group comprising a plurality of gaming devices, and wherein the illuminated frame system is jointly associated with the plurality of gaming devices.

21. An illuminated frame system for framing a display unit comprising:
- a frame on which a lighting configured to illuminate the frame is arranged, wherein the frame frames a frame interior where the display unit is to be arranged, and wherein the frame is made up of a plurality of frame parts, wherein the lighting comprises LEDs; and
- a shading configured to shade the frame interior from light which is emitted by the lighting, wherein the shading is associated with the lighting, wherein said frame parts are connected to one another and have, at their end sections, a complementary connector, wherein the connector is configured to be engageable in an interlocking manner, wherein a profile recess extends in the plurality of frame parts and is open in the direction of a frame front side, wherein the profile recess is configured to arrange the lighting in a recessed manner, wherein a profile flank is configured to delimit the profile recess, and wherein the profile flank blanks-off the lighting which is recessed in the profile recess with respect to the frame interior; and
- a fastener configured to fasten at least one screen to the frame, wherein the fastener is arranged on a frame support part, wherein the frame support part is provided in the frame interior, and wherein the frame interior is enclosed by the frame.

\* \* \* \* \*